US005749355A

United States Patent [19]
Roan et al.

[11] Patent Number: 5,749,355
[45] Date of Patent: May 12, 1998

[54] MULTI-POSITION FURNACE WITH CONDENSING HEAT EXCHANGER

[75] Inventors: Rodney S. Roan, Carrollton; Mark R. Rakowski, Frisco; Myron C. Oglesby, Jr., Hickory Creek, all of Tex.

[73] Assignee: Lennox Industries Inc., Richardson, Tex.

[21] Appl. No.: 703,640

[22] Filed: Aug. 27, 1996

[51] Int. Cl.⁶ ..................................................... F24H 3/02
[52] U.S. Cl. ................................. 126/110 R; 126/116 R
[58] Field of Search .................... 126/110 R, 116 R, 126/116 A

[56] References Cited

U.S. PATENT DOCUMENTS

| | | | |
|---|---|---|---|
| 5,309,890 | 5/1994 | Rieke et al. | 126/110 R |
| 5,320,087 | 6/1994 | Froman | 126/110 R |
| 5,379,749 | 1/1995 | Rieke et al. | |

*Primary Examiner*—Carroll B. Dority
*Attorney, Agent, or Firm*—W. Kirk McCord

[57] ABSTRACT

A furnace is adapted for operation in downflow, left horizontal flow and right horizontal flow positions. The furnace includes plural burners, a two-stage heat exchanger, a header box at the heat exchanger outlet for collecting products of combustion from the heat exchanger, and an inducer for inducing a flow of products of combustion through the heat exchanger. A condensate drain and trap are also provided for draining condensation from the header box and from an exhaust vent through which products of combustion are exhausted from the furnace. In accordance with one feature of the invention, a manifold is located inside the header box to divide the header box into first and second chambers. A pressure sensor senses differential fluid pressure between the first and second chambers for detecting a blocked condensate drain condition. In accordance with another feature of the invention, an intake air manifold located between a combustion air intake duct and an enclosure housing the burners includes opposed inlet openings and an outlet opening. A perforated baffle is positioned between the inlet openings for interrupting air flow between the inlet openings and cooperates with another perforated baffle in the burner enclosure to distribute combustion air to the burners. In accordance with still another feature of the invention, the furnace is provided with a condensate trap which is operable either in a vertical or a horizontal orientation, depending upon the position of the furnace. The trap is always installed in the same position relative to a furnace connector fitting, but is operable in either a vertical or horizontal orientation to accommodate both downflow and horizontal flow operation of the furnace.

18 Claims, 9 Drawing Sheets

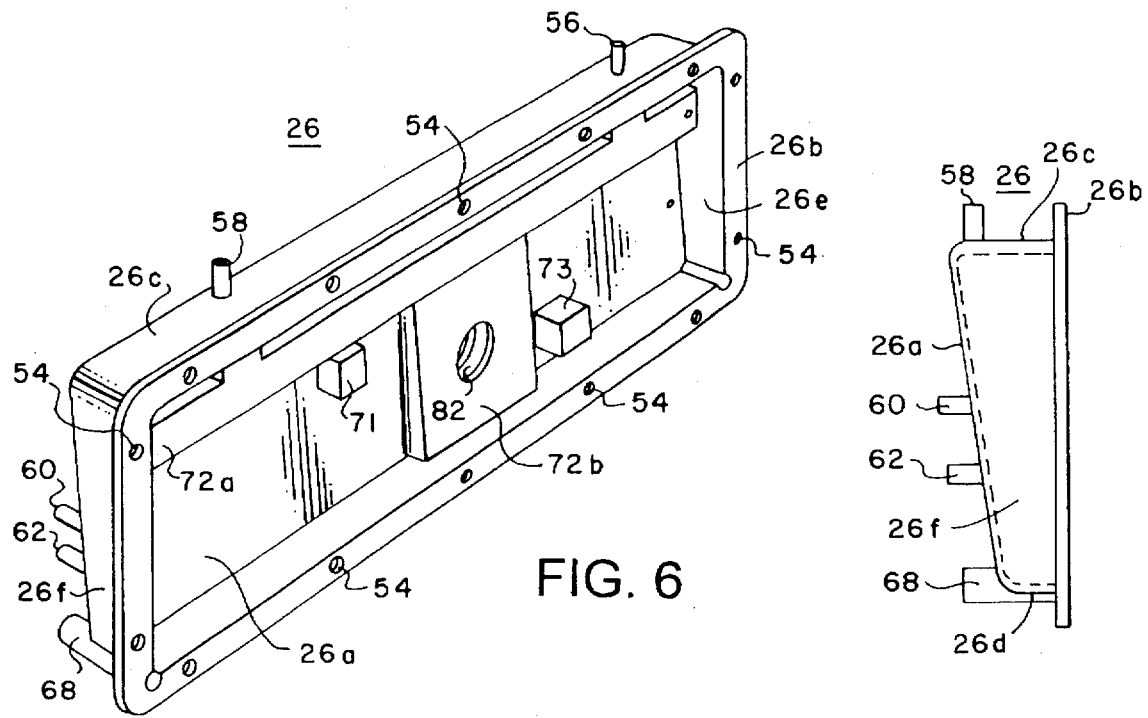
FIG. 6
FIG. 7
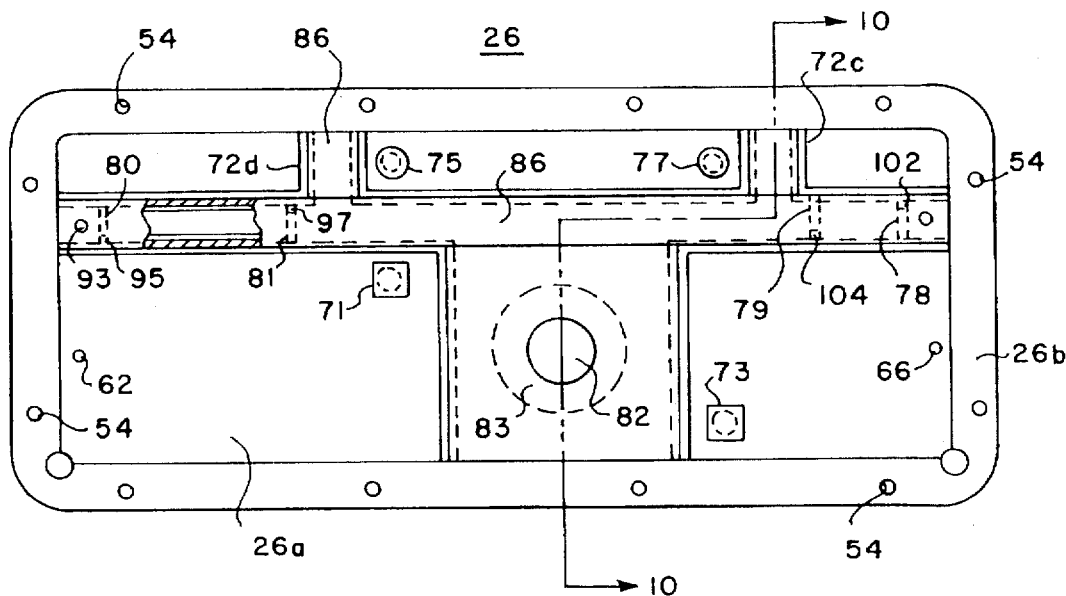
FIG. 8

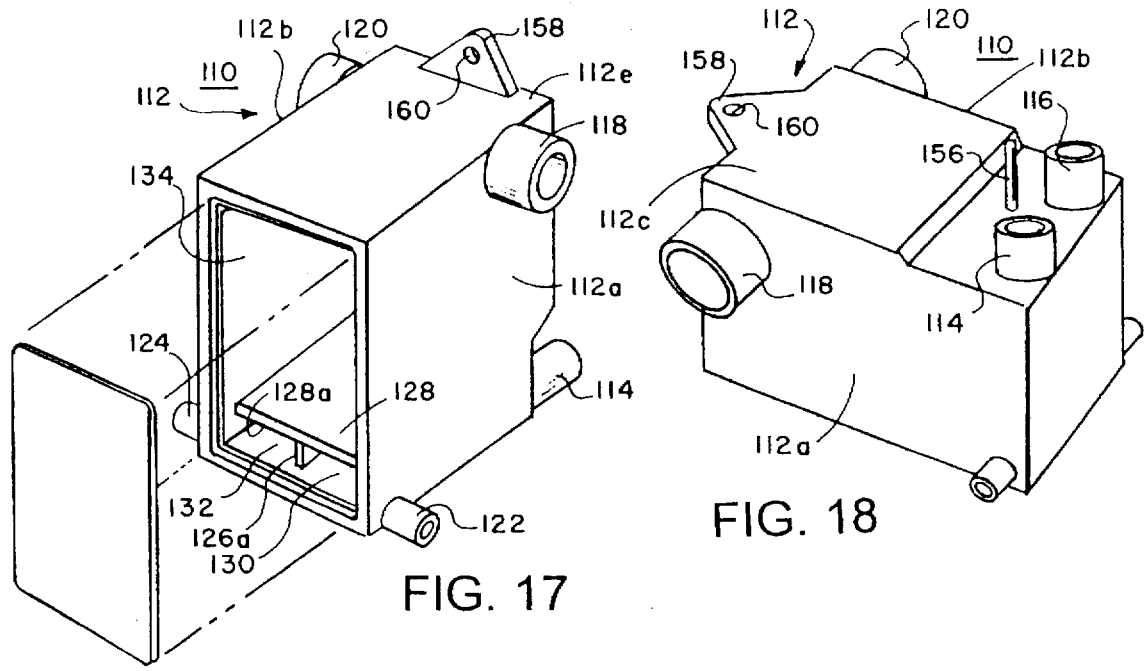
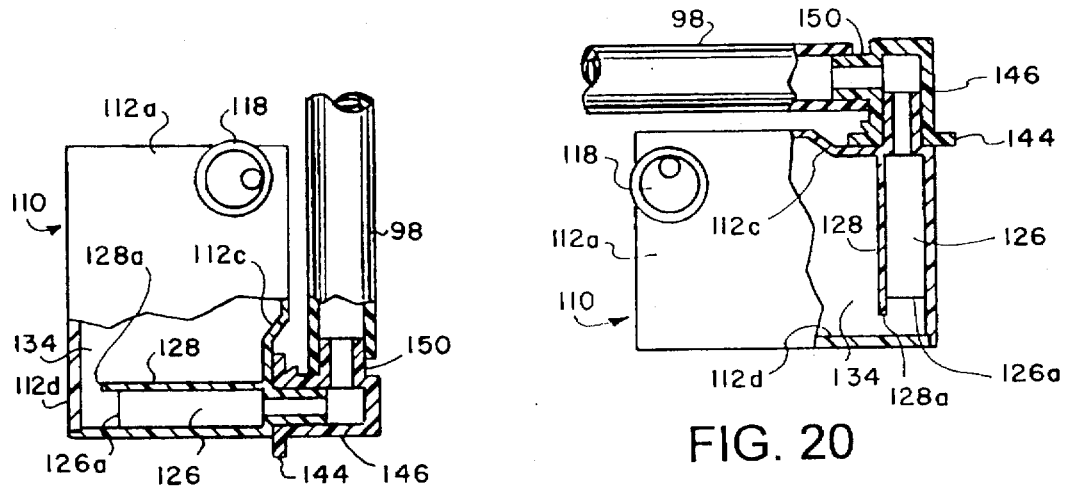
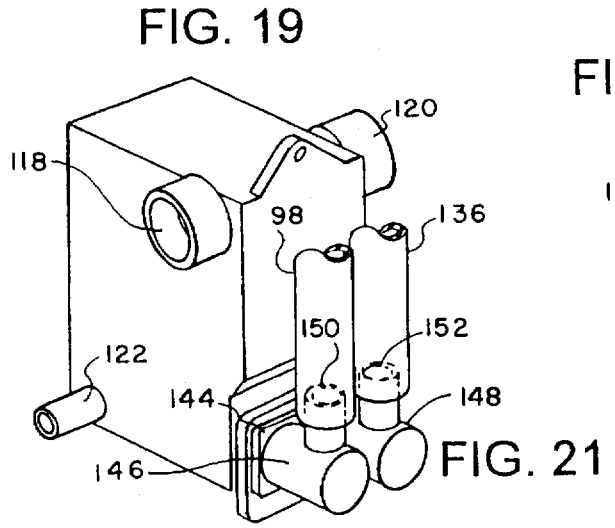
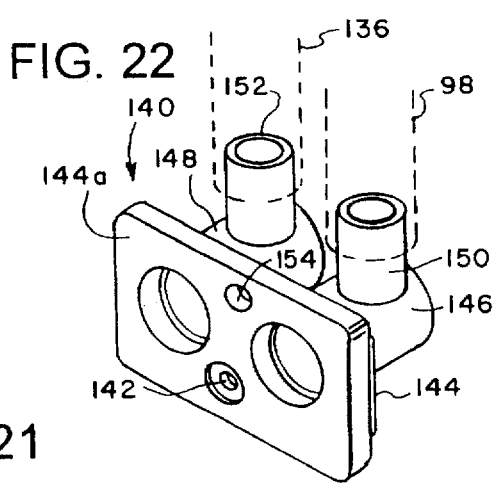

MULTI-POSITION FURNACE WITH CONDENSING HEAT EXCHANGER

TECHNICAL FIELD

This invention relates generally to furnaces for providing heated air to a conditioned space and in particular to improvements in a furnace which is adapted for downflow and horizontal flow operation.

BACKGROUND ART

In a conventional furnace, such as a gas-fired forced air furnace, a thermostat senses a temperature in a conditioned space relative to a predetermined set point temperature. When the temperature is below the set point temperature, the thermostat sends an electrical signal to the furnace as a call for heat, which activates furnace operation. An air blower associated with the furnace supplies heated air to the conditioned space via a supply air duct and air from the conditioned space is returned to the furnace for re-heating via a return air duct. When the conditioned space is warmed sufficiently to reach the set point temperature, the thermostat terminates the call for heat signal, which causes the furnace to initiate a shut-off sequence until the next call for heat.

Modern furnaces typically include a metal cabinet in which the furnace components are housed, plural burners for burning a combustible fuel-air mixture, a fuel supply valve for controlling the fuel supply to the burners, an air intake duct for supplying combustion air to the burners, a heat exchanger for receiving products of combustion from the burners, an induced draft blower for inducing a flow of products of combustion through the heat exchanger and for exhausting products of combustion from the furnace through an external exhaust duct. Certain types of furnaces have both a primary and a secondary heat exchanger, the secondary heat exchanger sometimes being referred to as a condensing heat exchanger because products of combustion may be cooled sufficiently to produce condensation in the secondary heat exchanger. Such furnaces also have a drain (including a trap) for draining condensation from the furnace. The trap forms a fluid tight seal between the exhaust duct and an external environment to which condensation is drained from the furnace. In the case of a so-called multi-position furnace, which is adapted for operation in multiple supply airflow directions (e.g., downflow, left horizontal flow and right horizontal flow), the condensate trap must be adapted to operate in multiple furnace positions.

One problem sometimes encountered in so-called condensing furnaces is that a drain conduit external to the furnace may become blocked, causing condensation to back up into a cold end header box at the outlet of the secondary heat exchanger. A pressure switch senses air pressure across a combustion air orifice through which products of combustion collected in the header box are drawn out of the header box by the induced draft blower. If condensation builds up in the header box to the level of the combustion air orifice because of a blocked drain conduit, the pressure switch opens in response thereto, indicating insufficient combustion air flow. However, in order for the pressure switch to open, the condensation must build up to a relatively high level within the header box. It is therefore desirable to be able to detect the presence of condensation within the header box before it reaches the level of the combustion air orifice.

Another problem associated with condensate traps used in multi-position furnaces is that the traps usually must be maintained in a vertically oriented direction, irrespective of the position of the furnace. Therefore, the condensate trap must be adapted to be installed in different positions relative to the furnace cabinet in order to accommodate different furnace operating positions while still maintaining the trap in a vertically oriented direction, thereby making installation of the trap more complicated in a multi-position furnace.

Still another problem associated with multi-position furnaces is the proper distribution of combustion air to the burners. For example, when the furnace is operated in the left horizontal flow or the right horizontal flow position, an intake air manifold is typically positioned between an air intake duct and an enclosure housing the burners. The intake air manifold may have more than one inlet opening to accommodate the different furnace positions. Because combustion air flows into the intake air manifold in different directions, depending upon the furnace position, it is often difficult to distribute equal amounts of combustion air to the burners.

Yet another problem associated with multi-position furnaces is the routing of the air intake and exhaust ducts outside the furnace, particularly when the furnace is positioned for downflow operation. Usually, the two ducts are routed side-by-side along the outside of the furnace, requiring additional space for the furnace installation, or the ducts are offset using an elbow fitting or the like.

There is, therefore, a need for an improved multi-position furnace and in particular a multi-position furnace having a condensing heat exchanger.

SUMMARY OF THE INVENTION

In accordance with the present invention, an improved multi-position furnace is provided for supplying heated air to an indoor space. The furnace is operable in downflow, left horizontal flow and right horizontal flow positions. The furnace has plural burners for burning a combustible fuel-air mixture, a two-stage heat exchanger having an inlet communicating with the burners for receiving products of combustion therefrom and an outlet, a header at the heat exchanger outlet for receiving products of combustion from the heat exchanger, an inducer communicating with the header for inducing a flow of products of combustion through the heat exchanger and for exhausting products of combustion from the header, and a drain for draining condensation from the header and from an exhaust duct through which products of combustion are exhausted from the furnace.

In accordance with one feature of the invention, a manifold is located inside the header to define first and second chambers within the header. The first chamber is inside the manifold and the second chamber is outside the manifold. Pressure sensing means is provided for sensing differential fluid pressure between the first and second chambers. The furnace is disabled in response to the differential fluid pressure being less than a predetermined magnitude. If the differential fluid pressure is less than the predetermined magnitude, a blocked condensate drain condition is indicated.

In accordance with another feature of the invention, the header is mounted on a furnace vestibule panel and the inducer is mounted on a mounting surface of the header which faces away from the vestibule panel. The header mounting surface is slanted such that the header mounting surface is not parallel to the vestibule panel. By slanting the header surface on which the inducer is mounted, the exhaust duct, which is connected to the inducer discharge, may be offset with respect to a combustion air intake duct, which supplies combustion air to the burners, thereby conserving space in the compartment where the furnace is installed.

In accordance with yet another feature of the invention, an intake air manifold is positioned intermediate the air intake duct and an enclosure housing the burners. The intake air manifold has opposed first and second inlets and an outlet. One of the inlets receives combustion air from the air intake duct and the other inlet is capped. The particular inlet which is used depends upon the operating position of the furnace. The outlet communicates with the burner enclosure, whereby combustion air is introduced into the burner enclosure. A diffuser member is positioned between the first and second inlets to interrupt airflow therebetween and to direct a flow of air through the outlet into the burner enclosure. A second diffuser member located in the burner enclosure cooperates with the diffuser member in the intake air manifold to enhance distribution of combustion air to the burners.

In accordance with a further feature of the invention, the inducer defines on a suction side thereof (i.e., within the header) a negative gas pressure environment with respect to an external environment and on a discharge thereof (i.e., within the exhaust duct) a positive gas pressure environment with respect to the external environment. The drain includes a first conduit communicating between the negative gas pressure environment and the external environment for draining condensation from the negative gas pressure environment to the external environment and a second conduit communicating between the positive gas pressure environment and the external environment for draining condensation from the positive gas pressure environment to the external environment. A trap is interposed between each of the first and second conduits and the external environment to inhibit non-liquid products of combustion (i.e., exhaust gases) from flowing through the first and second conduits to the external environment. The trap has a housing with first, second and third chambers therein. A first partition separates the first and second chambers and a second partition separates each of the first and second chambers from the third chamber. The trap further includes first and second inlets communicating with the first and second chambers, respectively, and an outlet communicating with the third chamber through which condensation flows from the trap into a drain conduit communicating with the external environment. The first chamber receives condensation from the negative gas pressure environment and the second chamber receives condensation from the positive gas pressure environment. The first and second chambers communicate with the third chamber beyond a distal end of the second partition. The first chamber communicates directly with the second chamber beyond a distal end of the first partition.

The first and second chambers each have a major dimension and a minor dimension. The major dimensions of the first and second chambers are oriented horizontally when the furnace is positioned for downflow operation, wherein condensation accumulates in the first and second conduits at respective first and second levels to define first and second liquid seals, respectively, between the negative gas pressure environment and the external environment and between the positive gas pressure environment and the external environment. Condensation accumulates in the third chamber at an equilibrium level between the first and second levels. The major dimensions of the first and second chambers are oriented in a vertical direction when the furnace is positioned for horizontal flow operation, wherein condensation accumulates in the first and second chambers at respective third and fourth levels to provide third and fourth liquid seals, respectively, between the negative gas pressure environment and the external environment and between the positive gas pressure environment and the external environment and condensation accumulates in the third chamber at an equilibrium level between the third and fourth levels.

BRIEF DESCRIPTION OF DRAWINGS

FIG. 6 is a perspective view of a cold end header box of the furnace of FIG. 1;

FIG. 7 is an end elevation view of the header box of FIG. 6;

FIG. 8 is a front elevation view of the header box of FIG. 6, looking into the interior thereof;

FIG. 17 is a perspective view of the condensate trap, with a back wall removed to show the interior thereof;

FIG. 18 is a perspective view of the condensate trap;

FIG. 19 is a side elevation, partial cutaway view of the condensate trap with a collar attached thereto, showing the orientation of the trap when the furnace is positioned for downflow operation;

FIG. 20 is a side elevation, partial cutaway view of the condensate trap with the collar attached thereto, showing the orientation of the trap when the furnace is positioned for right horizontal flow operation;

FIG. 21 is a perspective view of the trap with the collar attached thereto;

FIG. 22 is a perspective view of the collar;

BEST MODE FOR CARRYING OUT THE INVENTION

The best mode for carrying out the invention will now be described with reference to the accompanying drawings. Like parts are marked with the same respective reference numbers throughout the specification and the drawings. The drawings are not necessarily to scale and in some instances proportions may have been exaggerated in order to more clearly depict certain features of the invention.

Figure 1:
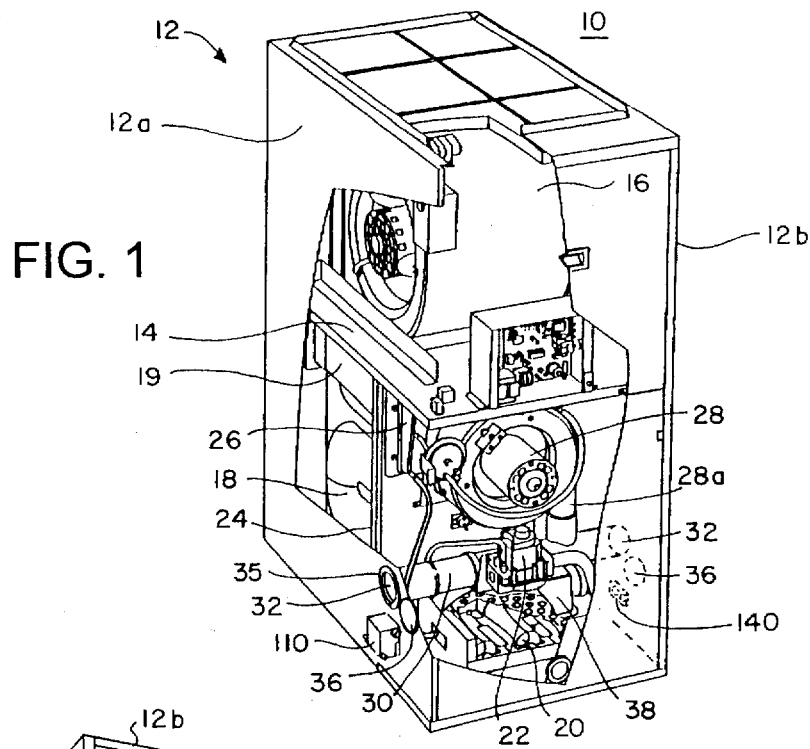
FIG. 1 is a perspective, partial cutaway view of an improved multi-position furnace in accordance with the present invention, positioned for downflow operation.
Figure 2:
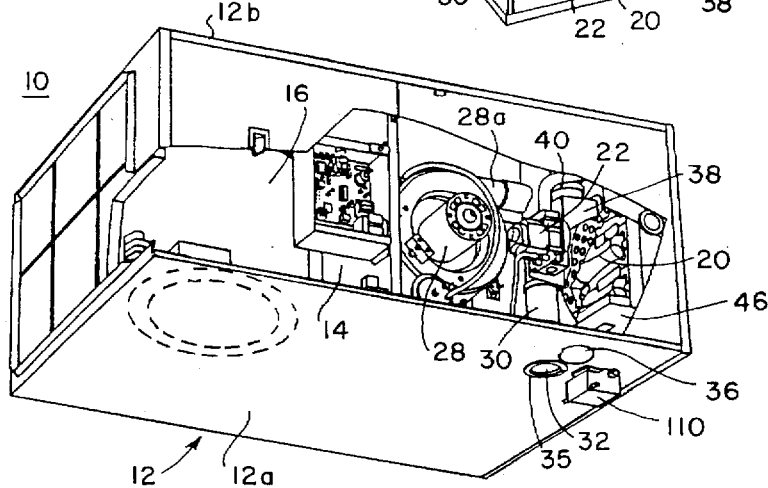
FIG. 2 is a perspective, partial cutaway view of the furnace of FIG. 1, positioned for right horizontal flow operation.
Figure 3:
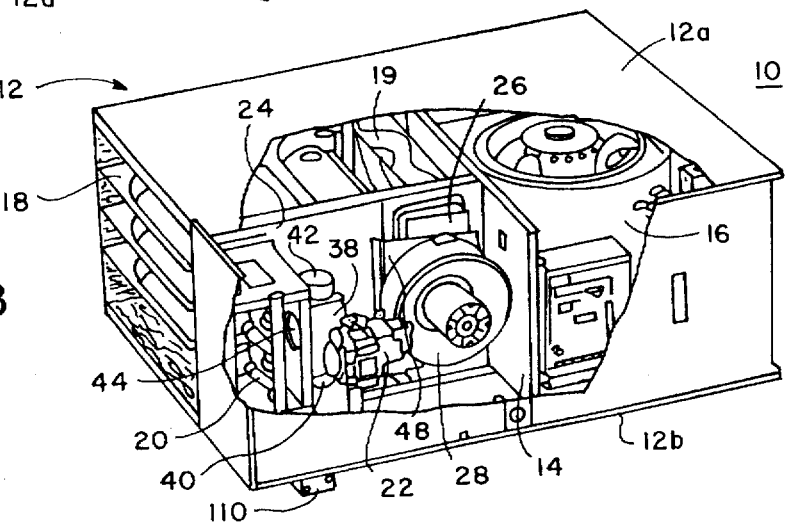
FIG. 3 is a perspective, partial cutaway view of the furnace of FIG. 1, positioned for left horizontal flow operation.

Referring to FIGS. 1-3, a furnace 10 is adapted for operation in a downflow position (FIG. 1), a right horizontal flow position (FIG. 2) and a left horizontal flow position (FIG. 3). Furnace 10 has a metal (preferably steel) cabinet 12, the interior of which is divided into two compartments by an interior partition 14. On one side of partition 14 is a blower compartment in which a supply air blower 16 is located. On the other side of partition 14 is a heat exchanger compartment in which a primary heat exchanger 18 and a secondary heat exchanger 19 are located. Secondary heat exchanger 19 is a condensing heat exchanger wherein products of combustion may be cooled sufficiently to form condensation in secondary heat exchanger 19. Primary heat exchanger 18 is preferably a multi-pass clamshell heat exchanger. Secondary heat exchanger 19 is preferably a tube and fin heat exchanger with stainless steel tubes and aluminum fins.

Furnace 10 includes a plurality of burners 20 for burning a combustible gas-air mixture. A gas valve 22 controls the supply of gas to burners 20. Burners 20 communicate with an inlet to primary heat exchanger 18 through corresponding openings in a vestibule panel 24. A cold end header box 26 is mounted on panel 24 at an outlet of secondary heat exchanger 19 for receiving products of combustion from secondary heat exchanger 19. Primary heat exchanger 18 communicates between burners 20 and a hot end header box (not shown). Secondary heat exchanger 19 communicates between the hot end header box and cold end header box 26. An induced draft blower 28 is mounted on header box 26 and is operative to induce a flow of products of combustion through heat exchanger 18. A suction side of blower 28 communicates with the interior of header box 26. A discharge side 28a of blower 28 tees into an exhaust header 30, which extends in both directions across furnace 10 and through a port 32 on each side of cabinet 12.

Figure 4:
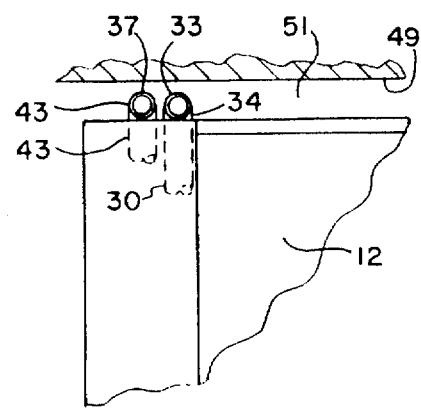
FIG. 4 is a side elevation view of the furnace of FIG. 1, positioned for downflow operation, illustrating the introduction of combustion air into the furnace and the exhaustion of products of combustion therefrom.
Figure 5:
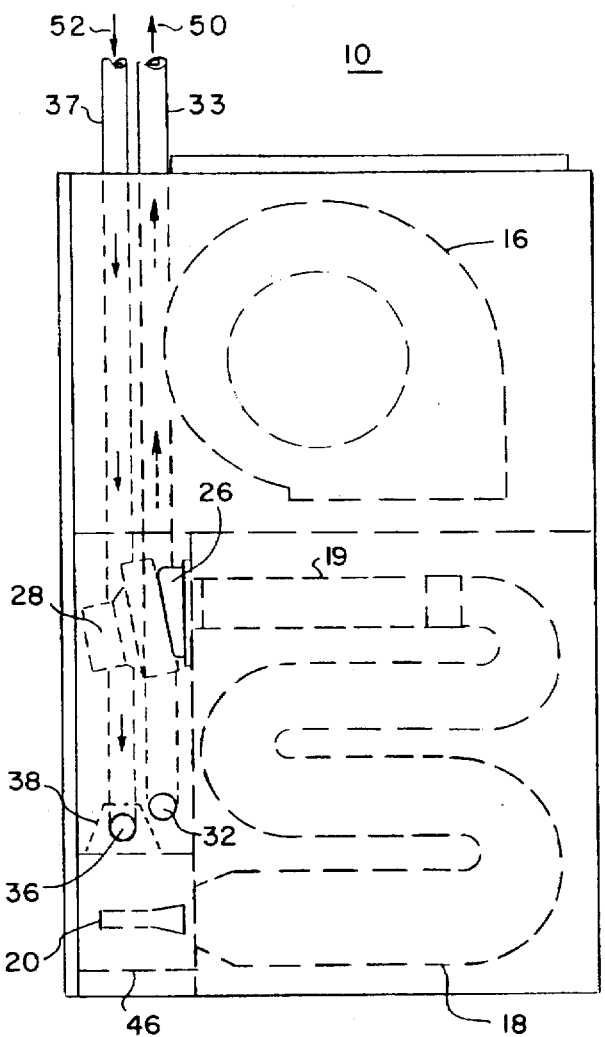
FIG. 5 is a top plan view of a portion of the furnace of FIG. 1, positioned for downflow operation, showing combustion air intake and exhaust ducts external to the furnace.
Figure 9:
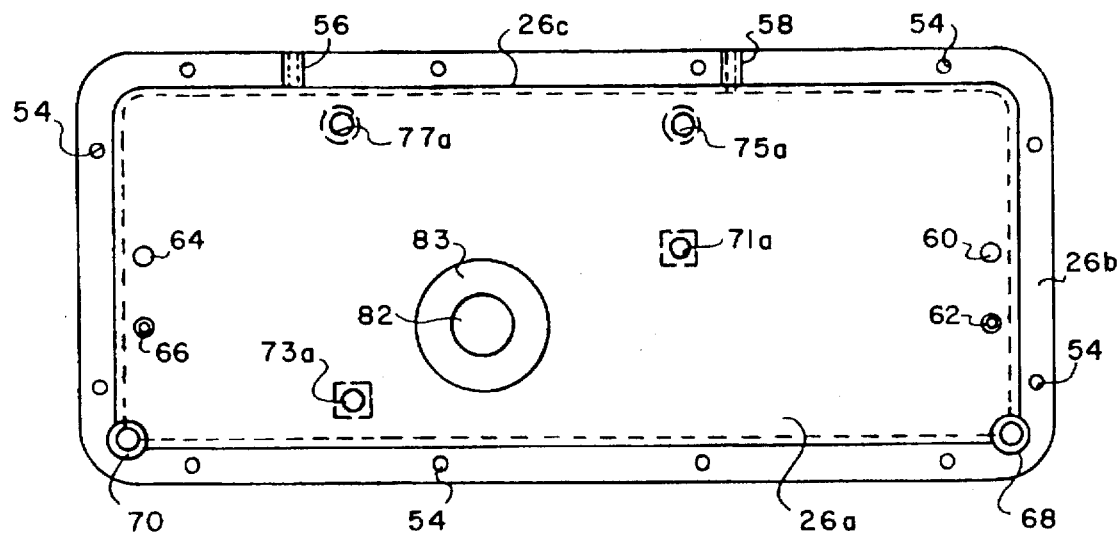
FIG. 9 is a rear elevation view of the header box of FIG. 6.
Figure 10:
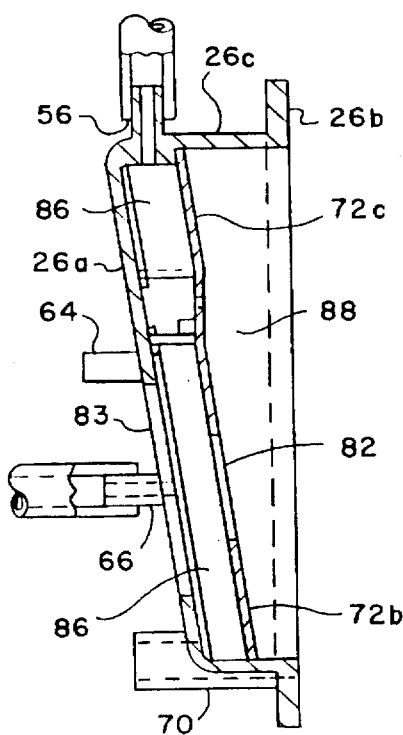
FIG. 10 is a sectional view, taken along line 10—10 of FIG. 8.

Referring also to FIGS. 4 and 5, exhaust header 30 is connected to an external exhaust duct 33 (FIG. 4), which extends upwardly along the outside of furnace 10 for exhausting products of combustion therefrom when furnace 10 is in the downflow position, as shown in FIG. 4. A suitable connector, such as an elbow fitting 34, may be used to connect exhaust duct 33 to exhaust header 30. However, when furnace 10 is either in the left horizontal or right horizontal flow position, exhaust duct 33 may be connected directly to exhaust header 30 without the need for elbow fitting 34 because exhaust header 30 is oriented vertically when furnace 10 is in a horizontal position. A flue collar 35 is located on each end of exhaust header 30 to facilitate attachment of duct 33 to exhaust header 30. When furnace 10 is in a horizontal position, attachment of duct 33 to header 30 is always through the upwardly facing port 32. The downwardly facing port 32 is plugged. When furnace 10 is in the downflow position, either port 32 may be used and the unused port 32 is plugged.

Located adjacent to port 32 on each side of cabinet 12 is a port 36, adapted to receive an air intake duct 37, whereby combustion air is supplied to burners 20. An intake air manifold 38 having opposed inlets 40, 42 and an outlet 44 (as can be best seen in FIG. 3) is mounted with its outlet 44 communicating with the interior of an enclosure 46 in which burners 20 are housed. Intake air manifold 38 is adapted to receive combustion air through either inlet 40, 42, depending upon the position of furnace 10. For example, when furnace 10 is positioned for right horizontal flow operation (FIG. 2), air intake duct 37 communicates with manifold 38 through inlet 40, which is the upwardly facing inlet in the right horizontal flow position. However, when furnace 10 is positioned for left horizontal flow operation (FIG. 3), air intake duct 37 communicates with manifold 38 through inlet 42, which is the upwardly facing inlet in the left horizontal flow position. In each case, the unused inlet 40, 42 is plugged. When furnace 10 is positioned for downflow operation, duct 37 may be positioned on either side of furnace 10 so that either inlet 40 or inlet 42 can be used. The unused inlet 40, 42 is plugged. Further, when furnace 10 is positioned for downflow operation, duct 37 makes a 90° bend and enters furnace 10 through one of the ports 36. An elbow fitting 43 is used to connect duct 37 to manifold 38.

As can be best seen in FIG. 4, a back wall 26a of header 26 is slanted at an angle of approximately 8° with respect to a vertical axis. As can be best seen in FIG. 3, a metal sheet 48 is positioned intermediate an exterior surface of back wall 26a and blower 28 to facilitate mounting blower 28 with header 26. The exterior surface of back wall 26a is the surface which faces away from panel 24. When blower 28 is mounted with header 26, discharge 28a is angled slightly inwardly because of the slanted back wall 26a. As a result, exhaust header 30 and exhaust duct 33 are offset from air intake duct 37, thereby allowing ducts 33 and 37 to be routed side-by-side upwardly along the outside of furnace 10, as can be best seen in FIG. 5. Because ducts 33 and 37 are run side-by-side, as shown in FIG. 5, less space is needed between a wall 49 of a compartment 51 (FIG. 5) in which furnace 10 is installed and furnace 10, particularly when furnace 10 is installed for downflow operation, as in FIG. 4. Arrows 50 depict the upward flow of exhaust gases through exhaust duct 33 and arrows 52 depict the downward flow of incoming combustion air through air intake duct 37.

Referring now to FIGS. 6-11, header box 26 is a generally rectangular plastic box with an open front and a mounting flange 26b surrounding the open front. Header box 26 further includes opposed side walls 26c, 26d and opposed end walls 26e, 26f. Flange 26b has plural holes 54 for receiving suitable fasteners (not shown) such as mounting screws for mounting header box 26 with vestibule panel 24.

A gasket (not shown) is interposed between panel 24 and flange 26b to effect a fluid tight seal when header box 26 is mounted with vestibule panel 24.

Nipples 60, 62, 64, 66 project from an exterior surface of back wall 26a. Nipples 68, 70 project from flange 26b. Bosses 71, 73 on an interior surface of back wall 26a define respective recesses 71a, 73a on the exterior surface of back wall 26a. Recesses 71a, 73a are adapted to receive suitable mounting members (not shown) for mounting induced draft blower 28 with back surface 26a. The interior surface of back wall 26a has two more bosses 75, 77 which define respective recesses 75a, 77a on the exterior surface of back wall 26a for mounting metal sheet 48 (FIGS. 1, 3) with the exterior surface of back wall 26a.

Figure 11:
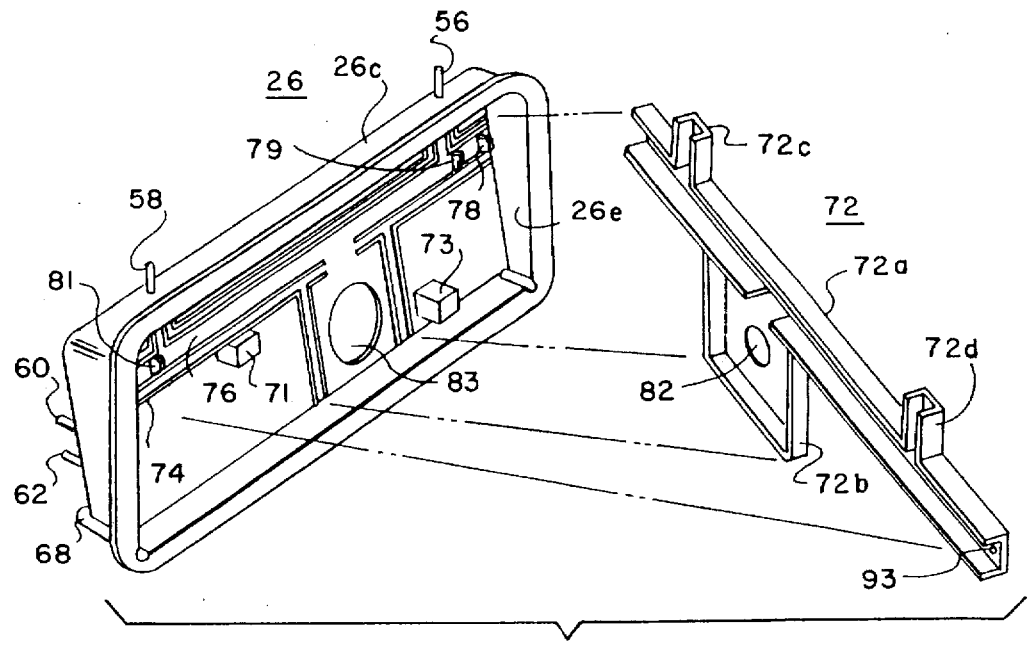
FIG. 11 is an exploded perspective view of the header box of FIG. 6.

As can be best seen in FIG. 11, a manifold 72 is located within header box 26. Manifold 72 includes a U-shaped elongated member 72a, a generally rectangular member 72b projecting from member 72a and two U-shaped members 72c, 72d projecting from member 72a in an opposite direction from the direction in which member 72b projects from member 72a. Members 72a, 72b, 72c, 72d are preferably integrally formed and are made of plastic.

The interior of header box 26 has a plurality of ribs 74 projecting from the interior surface of back wall 26a, which define plural slots 76 therebetween. Slots 76 are adapted to receive the edges of members 72a, 72b, 72c, 72d, whereby manifold 72 is seated within header box 26. Manifold 72 is attached to the interior surface of back wall 26a, preferably by five stainless steel screws, and is sealed to back wall 26a by a suitable sealant material. Tabs 78, 79, 80, 81 project from the interior surface of back wall 26a. Member 72b has a central opening 82, which is in alignment with a larger central opening 83 in header box 26 when manifold 72 is seated within header box 26. The aligned openings 82, 83 define a combustion air orifice through which the suction side of induced draft blower 28 communicates with the interior of header box 26 for drawing products of combustion therefrom.

When manifold 72 is seated within header box 26, as shown in FIG. 6, it divides the interior of header box 26 into first and second chambers 86, 88, first chamber 86 being inside manifold 72 and second chamber 88 being outside manifold 72, but inside header box 26. Second chamber 88 is sealed when header box 26 is mounted with vestibule panel 24 (FIG. 4). Nipples 56, 58 are hollow and have internal passageways which communicate with first chamber 86. Nipple 56 communicates with first chamber 86 through member 72c and nipple 58 communicates with first chamber 86 through member 72d. Nipples 62, 66 are also hollow and have internal passageways which communicate with second chamber 88.

As can be best seen in FIG. 8, member 72b may be offset from the center of header box 26, depending on the desired position of blower 28. When member 72b is offset as in FIG. 8, the combustion air orifice defined by openings 82, 83 is closer to right end 26e of header box 26 than to left end 26f thereof. Therefore, when furnace 10 is in the right horizontal flow position, the combustion air orifice is closer to the bottom part of header box 26 (in this configuration, end 26e). To accommodate this offset, member 72c and nipple 56 are located closer to end 26e than member 72d and nipple 58 are located with respect to end 26f. Similarly, tabs 78 and 79 are closer together than are tabs 80 and 81.

Figure 12:
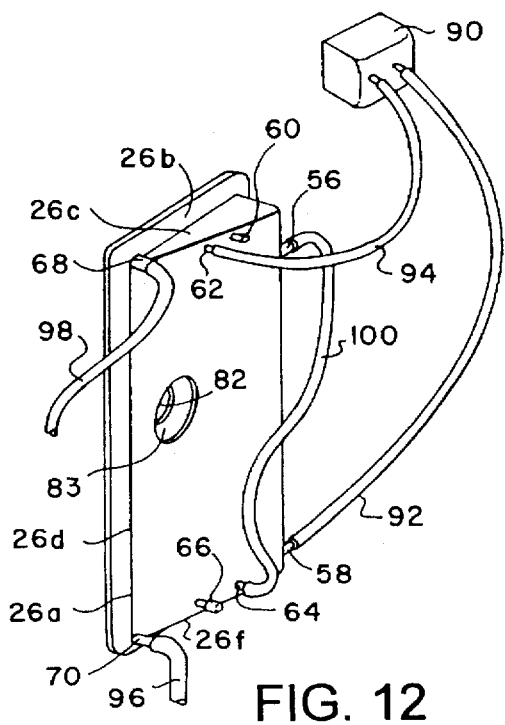
FIG. 12 is a perspective view of a device for detecting a blocked condensate drain condition in the furnace when the furnace is positioned for left horizontal flow operation.
Figure 13:
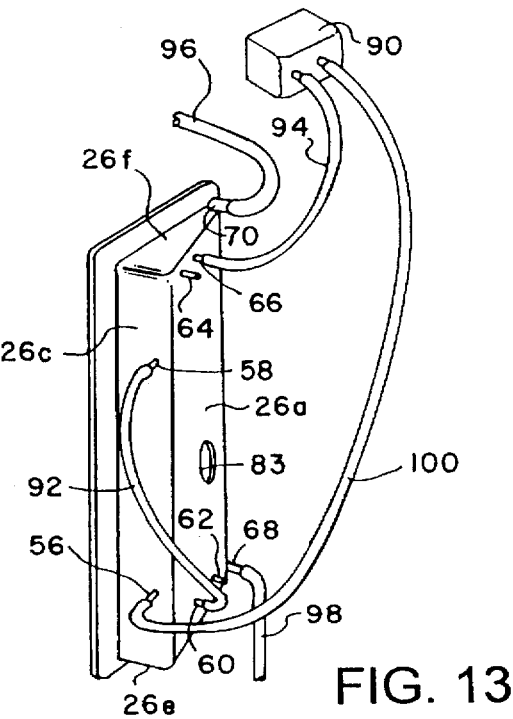
FIG. 13 is a perspective view of a device for detecting a blocked condensate drain condition in the furnace when the furnace is positioned for right horizontal flow operation.

Referring also to FIGS. 12 and 13, a pressure switch 90 is used to measure differential gas pressure between first and second chambers 86 and 88. When furnace 10 is positioned for left horizontal flow operation, as shown in FIG. 12, a first conduit 92 is coupled between nipple 58 and pressure switch 90 for measuring fluid pressure in first chamber 86. A second conduit 94 is coupled between nipple 62 and pressure switch 90 for measuring fluid pressure in second chamber 88. When induced draft blower 28 is in operation, it creates a negative gas pressure environment within both first and second chambers 86, 88, the negative pressure within first chamber 86 being slightly more negative (e.g., by approximately one inch of water) than within second chamber 88. As such, condensation accumulating in the bottom of header box 26 (in this configuration, at end 26f) rises slightly higher within first chamber 86 than in second chamber 88 because of the greater negative gas pressure. Hole 93 is located in member 72a proximate to end 26f. The greater negative gas pressure in first chamber 86 draws condensation from second chamber 88 into first chamber 86 through hole 93. Condensation is also drawn into first chamber 86 where member 72a contacts end 26f. Tabs 80 and 81 prevent condensation from surging upwardly within first chamber 86 into member 72d. Tabs 80 and 81 have respective notches 95, 97 to allow condensation to rise steadily upwardly in first chamber 86 within member 72a. Under normal circumstances, condensation will not rise above tab 81. If it does, then condensation may enter member 72d, causing pressure switch 90 to disable furnace 10.

A third conduit 96 is attached to nipple 70, to drain condensation from the bottom of header box 26. Nipple 70 is positioned at the bottom of header box 26 when furnace 10 is in the left horizontal flow position. Differential pressure is always measured by pressure switch 90 between the lower one of nipples 56, 58 and the upper one of nipples 62, 66. Condensation is drained from header box 26 through the lower one of nipples 68, 70. In FIG. 12, nipple 58 is the lower of the two nipples 56, 58, nipple 62 is the upper one of nipples 62, 66 and nipple 70 is the lower one of nipples 68, 70. However, nipple 58 is positioned above the level where condensation is likely to rise within first chamber 86 during normal circumstances. In the event of a blocked condensate drain condition, condensation will accumulate within header box 26 and the condensate levels will rise both in first and second chambers 86, 88. However, because of the greater negative pressure within first chamber 86, the condensate level will be higher within first chamber 86 and if it continues to rise to the level of nipple 58, pressure switch 90 will detect an abnormal pressure differential between chambers 86 and 88 and will signal the furnace control (not shown) to shut down furnace 10. Furnace shutdown will occur before condensation can rise to the level of the combustion air orifice. In the configuration shown in FIG. 12 (i.e., left horizontal flow furnace operation), nipple 66 is capped and a fourth conduit 98 is attached at one end thereof to nipple 68 and is plugged at an opposite end thereof Condensation is drained from header box 26 through conduit 96. A fifth conduit 100 is coupled between nipple 56 and nipple 64. Nipple 64 is used only in the left horizontal flow configuration to receive one end of conduit 100 and does not communicate with second chamber 88. Conduits 92, 94, 96, 98, 100 are preferably flexible hoses.

FIG. 13 depicts pressure switch 90 being used to detect a blocked condensate drain condition when furnace 10 is positioned for right horizontal flow operation. In this configuration, conduit 100 is coupled between pressure switch 90 and nipple 56, and conduit 92 is coupled between nipple 58 and nipple 60. Conduit 94 is coupled between pressure switch 90 and nipple 66, and nipple 62 is capped. Conduit 98 is coupled between nipple 68 and an external drain (not shown) for draining condensation from header box 26. Conduit 96 is attached at one end thereof to nipple 70 and is plugged at an opposite end thereof, such that condensation is drained from header box 26 through conduit 98. Nipple 60 is used only in the right horizontal flow configuration to receive one end of conduit 92 and does not communicate with second chamber 88.

In the right horizontal flow configuration, end 26e is at the bottom of header box 26. The negative gas pressure in first chamber 86 draws condensation from second chamber 88 into first chamber 86 where member 72a contacts end 26e. Tabs 78 and 79 prevent condensation from surging upwardly within first chamber 86 into member 72c. Tabs 78 and 79 have respective notches 102, 104 to allow condensation to rise steadily upwardly in first chamber 86. Under normal circumstances, condensation will not rise above tab 79. If it does, then condensation may enter member 72c causing pressure switch 90 to disable furnace 10. Because member 72c is closer to end 26e than member 72d is to end 26f, condensation will not have to rise as high within header box 26 due to a blocked condensate drain condition when furnace 10 is in the right horizontal flow position as compared to when furnace 10 is in the left horizontal flow position. Therefore, the separation between tabs 78 and 79 is less than the separation between tabs 80 and 81 because tab 79 is located between member 72c and end 26e.

Figure 14:
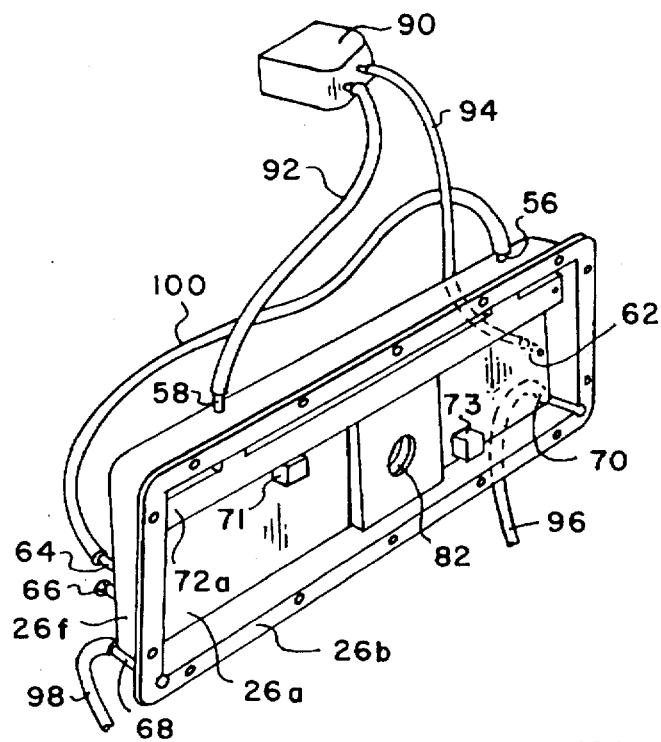
FIG. 14 is a perspective view of a device for detecting a blocked condensate drain condition in the furnace when the furnace is positioned for downflow operation.

Referring to FIG. 14, when furnace 10 is positioned for downflow operation, either nipple 56, 58 may be used to detect fluid pressure in first chamber 86; either nipple 62, 66 may be used to detect fluid pressure in second chamber 88; and either nipple 68, 70 may be used to drain condensation from header box 26. In FIG. 14, conduit 92 is connected between nipple 58 and pressure switch 90; conduit 94 is connected between nipple 62 and pressure switch 90; and conduit 98 is connected to nipple 68 for draining condensation from header box 26. Conduit 96 is attached at one end thereof to nipple 70 and is plugged at an opposite end thereof; conduit 100 is connected between nipple 56 and nipple 64; and nipple 66 is capped. In the downflow configuration, pressure switch 90 operates in its normal manner to detect differential pressure across the combustion air orifice. If condensation backs up into exhaust header 30 due to a blocked drain condition, pressure switch 90 senses a reduced pressure differential across the orifice and furnace 10 is disabled.

Referring now to FIGS. 1–3 and 15–23, a condensate trap 110 is attached to the outside of cabinet 12. Trap 110 has a housing 112 defined by six generally rectangular walls, two inlet fittings 114, 116, two outlet fittings 118, 120 and two drain fittings 122, 124. Trap 110 is preferably made of plastic.

The interior of housing 112 has first and second partitions 126, 128, respectively, which divide the interior of housing 112 into first, second and third chambers 130, 132, 134, respectively, as can be best seen in FIG. 17. First partition 126 separates first and second chambers 130, 132 and second partition 128 separates each of first and second chambers 130, 132 from third chamber 134. Inlet fittings 114, 116 communicate with chambers 130, 132, respectively, and outlet fittings 118, 120 communicate with third chamber 134 from opposed side walls 112a, 112b of housing 112. First partition 126 extends from a front wall 112c of housing 112 toward a back wall 112d of housing 112 and terminates short of back wall 112d to define a distal end 126a of first partition 126. Second partition 128 extends from front wall 112c toward back wall 112d and terminates short of back wall 112d to define a distal end 128a of second partition 128. As can be best seen in FIGS. 19 and 20, second partition 128 extends closer to back wall 112d than first partition 126, such that second partition 128 extends beyond first partition 126 in the direction of back wall 112d, whereby first chamber 130 communicates with second chamber 132 before either first chamber 130 or second chamber 132 communicates with third chamber 134. As can be best seen in FIG. 17, first partition 126 is oriented generally perpendicularly with respect to second partition 128. Both first partition 126 and second partition 128 are generally rectangular.

Figure 15:
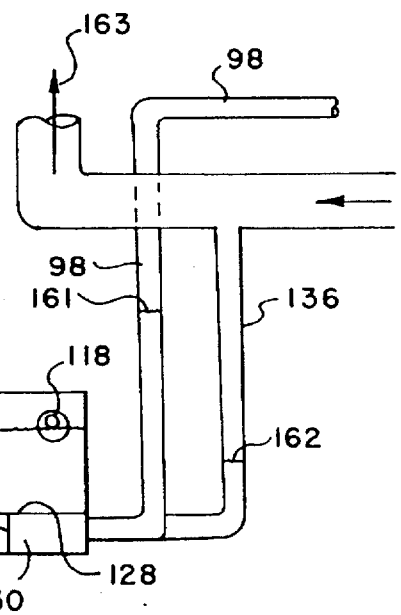
FIG. 15 is a schematic illustrating the operation of an improved condensate trap in the furnace when the furnace is positioned for downflow operation.
Figure 16:
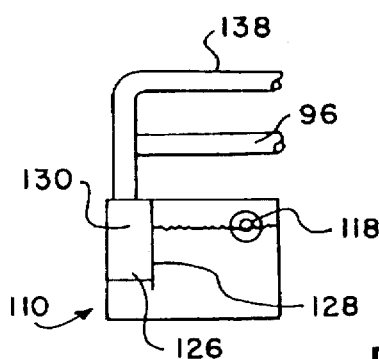
FIG. 16 is a schematic illustrating the operation of an improved condensate trap in the furnace when the furnace is positioned for left horizontal flow operation.
Figure 23:
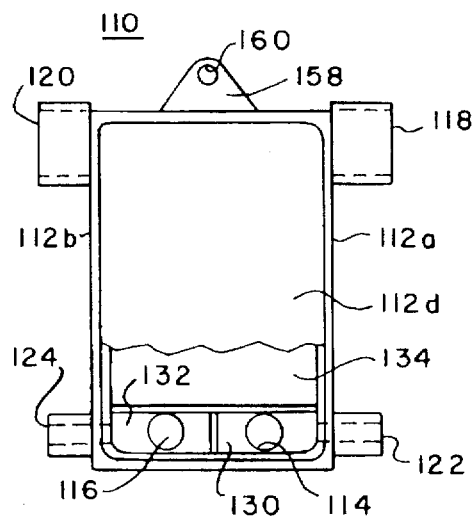
FIG. 23 is a rear elevation, partial cutaway view of the condensate trap, showing the orientation thereof when the furnace is positioned for downflow operation.

In operation, trap 110 is adapted to receive condensation drained from header box 26 via either conduit 96 (FIGS. 12 and 16) or conduit 98 FIGS. 13 and 15) and condensation from exhaust header 30 via a conduit 136 (FIG. 15) or a conduit 138 (FIG. 16). As can be best seen in FIGS. 21 and 22, a collar 140 is coupled to trap 110 for connecting trap 110 to the corresponding drain conduits (e.g., conduits 98 and 136 in FIGS. 21 and 22). As can be best seen in FIG. 1, a collar 140 is located on each one of opposed side walls 12a, 12b of cabinet 12 and is permanently attached to the corresponding side wall 12a, 12b by a suitable fastener such as a mounting screw (not shown), which extends through a hole 142 in collar 140. Trap 110 may be attached to the collar 140 on either side of furnace 10, depending upon the operating position of furnace 10. For example, in FIGS. 1 and 2, trap 110 is attached to collar 140 on wall 12a, whereas in FIG. 3, trap 110 is attached to collar 140 on wall 12b.

As can be best seen in FIGS. 21 and 22, collar 140 has a base member 144, first and second sockets 146, 148, respectively, projecting from base member 144, and first and second nipples 150, 152 projecting from sockets 146, 148, respectively. Nipples 150, 152 define respective inlet fittings of collar 140. Nipple 150 is adapted to receive a drain conduit from header box 26 (i.e., either conduit 96 or conduit 98) and nipple 152 is adapted to receive a drain conduit from exhaust header 30 (i.e., either conduit 136 or conduit 138). For example purposes only, in FIGS. 19, 21 and 22, conduit 98 is attached to nipple 150 and conduit 136 is attached to nipple 152, whereas in FIG. 20, conduit 96 is attached to nipple 150 and conduit 138 is attached to nipple 152. Base member 144 has an enlarged portion 144a which projects through an opening in the corresponding side wall 12a, 12b (see FIG. 1), such that trap 110 is attachable to the corresponding collar 140 by matingly engaging inlet fitting 114 with socket 146 and inlet fitting 116 with socket 148. Collar 140 has a second hole 154 for receiving a pin 156 projecting from front wall 112c. Trap 110 further includes an ear 158 depending from a wall 112e of housing 112 with a hole 160 adapted to receive a suitable fastener such as a mounting screw for attaching trap 110 to the corresponding wall 12a, 12b. A suitable adhesive material, such as glue, is preferably used to secure inlet fitting 114 in mating engagement with socket 146 and inlet fitting 116 in mating engagement with socket 148.

Although not shown in the drawings, one of the outlet fittings 118, 120 is coupled to a drain which communicates with an external ambient environment. The other one of outlet fittings 118, 120 which is not coupled to the drain is capped. Induced draft blower 28 creates a negative gas pressure environment with respect to the external ambient environment in header box 26 such that the conduit connecting header box 26 to trap 110 (i.e., conduit 96 or conduit 98) is under negative pressure with respect to the external ambient environment and creates a positive gas pressure environment with respect to the external ambient environment in exhaust header 30 such that the conduit connecting exhaust header 30 to trap 110 (i.e., conduit 136 or conduit 138) is under positive pressure with respect to the external ambient environment. The negative gas pressure environment created in either conduit 96 or conduit 98 and the positive gas pressure environment created in either conduit 136 or conduit 138 are best depicted in FIGS. 15 and 16. For simplicity purposes, collar 140 is not shown in FIGS. 15 and 16.

Inlet fitting 114 communicates with first chamber 130 and inlet fitting 116 communicates with second chamber 132. Because inlet fitting 114 is coupled to socket 146 and inlet fitting 116 is coupled to socket 148, a negative gas pressure environment is established in first chamber 130 and a positive gas pressure environment is established in second chamber 132. When furnace 10 is in the downflow position, trap 110 will be oriented as shown in FIGS. 15 and 19. Condensation draining from header box 26 into trap 110 through conduit 98 will rise to a level indicated at 161 as a result of the negative gas pressure environment in conduit 98 and condensation draining from exhaust header 30 into trap 110 through conduit 136 will rise to a level indicated at 162 as a result of the positive gas pressure environment in conduit 136. Exhaustion of products of combustion from furnace 10 through exhaust header 30 is indicated by arrows 163. The condensate level within trap 110 will rise to a level indicated at 164, which is an equilibrium level between level 161 and level 162. Condensate level 161 defines a first liquid seal between the negative gas pressure environment and the external environment and condensate level 162 defines a second liquid seal between the positive gas pressure environment and the external environment. Second partition 128 extends beyond first partition 126, as previously mentioned. Therefore, in the event of excessive pressure in the positive gas pressure environment when furnace 10 is in either the left horizontal flow position (FIG. 16) or the right horizontal flow position (FIG. 20), any exhaust gases entering second chamber 132 will bleed back into first chamber 130 and back into the negative gas pressure conduit (either conduit 96 or conduit 98) because second chamber 132 communicates with first chamber 130 before it communicates with third chamber 134. Therefore, exhaust gases from the positive gas pressure environment in second chamber 132 will not bleed into third chamber 134 or into the external drain through outlet 118 or outlet 120.

Because trap 110 is generally rectangular and not square, trap 110 has both a major dimension and a minor dimension. When furnace 10 is in the downflow position, the major dimension of trap 110 (which is approximately three inches) is oriented vertically. The liquid seals are maintained by the negative and positive head pressures in conduits 98, 136, respectively. As levels 161 and 162 rise, level 164 will also rise until it reaches the level of the corresponding outlet 118, 120, whereupon liquid will spill through the corresponding outlet 118, 120 into the external drain. By way of contrast, when furnace 10 is positioned for either left horizontal or right horizontal flow operation, the major dimension of trap 110 is oriented horizontally and the minor dimension (approximately two inches) is oriented vertically, as shown in FIGS. 16 and 20. For example, when furnace 10 is in the left horizontal flow position, conduits 96, 138 are oriented generally horizontally rather than vertically, as shown in FIGS. 15 and 19. Therefore, the liquid seals are maintained primarily by the liquid levels in chambers 130, 132 rather than by the liquid in conduits 96, 138. In FIGS. 15 and 19, the major dimensions of chambers 130, 132 are oriented horizontally, whereas in FIGS. 16 and 20, the major dimensions of chambers 130, 132 are oriented vertically for maintaining the requisite liquid seals. However, the vertical heights of chambers 130, 132 are not as great as the vertical heights of conduits 98, 136 when furnace 10 is in the downflow configuration and outlets 118, 120 are positioned such that liquid in third chamber 134 will reach the level of the corresponding outlet 118, 120 at a lower level than in the downflow configuration shown in FIGS. 15 and 19. Outlets 118, 120 are located proximate to respective corners of side walls 112a, 112b so that irrespective of which way trap 110 is oriented, outlets 118, 120 are positioned near the top of trap 110.

One skilled in the art will recognize that trap 110 is operable in either a vertical or a horizontal direction. When furnace 10 is positioned for downflow operation, as shown in FIG. 1, trap 110 is oriented vertically, as shown in FIGS. 15 and 19, and trap 110 may be connected on either side of cabinet 12 (i.e., to either wall 12a or wall 12b). When furnace 10 is oriented for either left or right horizontal flow operation, trap 110 is oriented horizontally, as shown in FIGS. 16 and 20. In the right horizontal flow position, as shown in FIG. 2, trap 110 is connected to wall 12a and when furnace 10 is in the left horizontal flow position, as shown in FIG. 3, trap 110 is attached to wall 12b. Because trap 110 is operable in either direction, installation thereof is facilitated because trap 110 always connects the same way to the corresponding collar 140.

Figure 24:
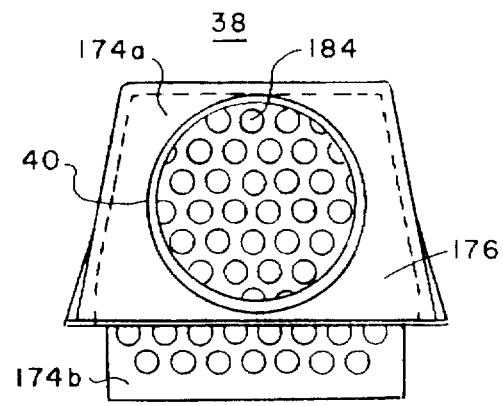
FIG. 24 is an end elevation view of an intake air manifold included in the furnace.
Figure 25:
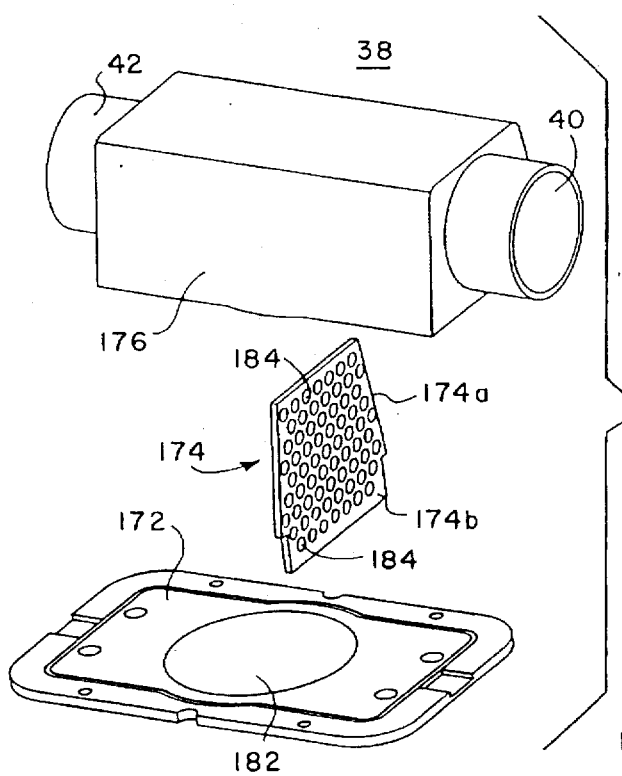
FIG. 25 is an exploded perspective view of the intake air manifold of FIG. 24.
Figure 26:
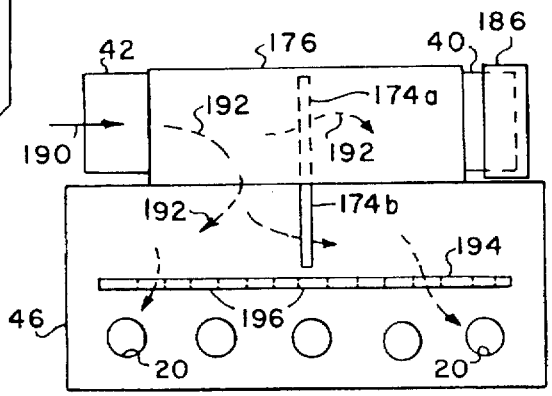
FIG. 26 is an elevation view of the intake air manifold and a burner enclosure of the furnace, illustrating the flow of combustion air to the burners.
Figure 27:
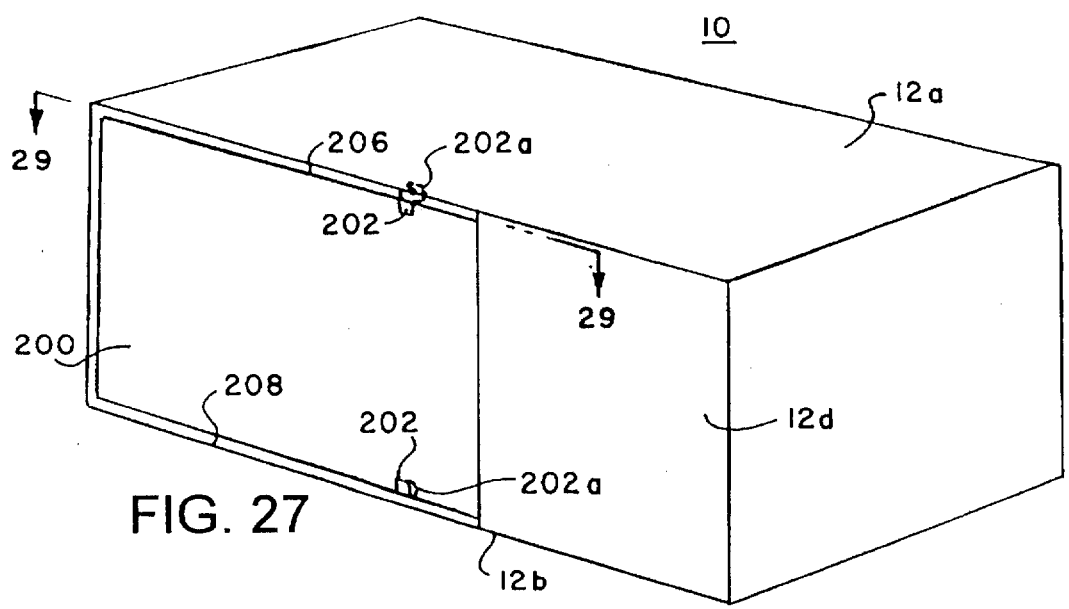
FIG. 27 is a perspective view of the furnace in a left horizontal flow position.
Figure 28:
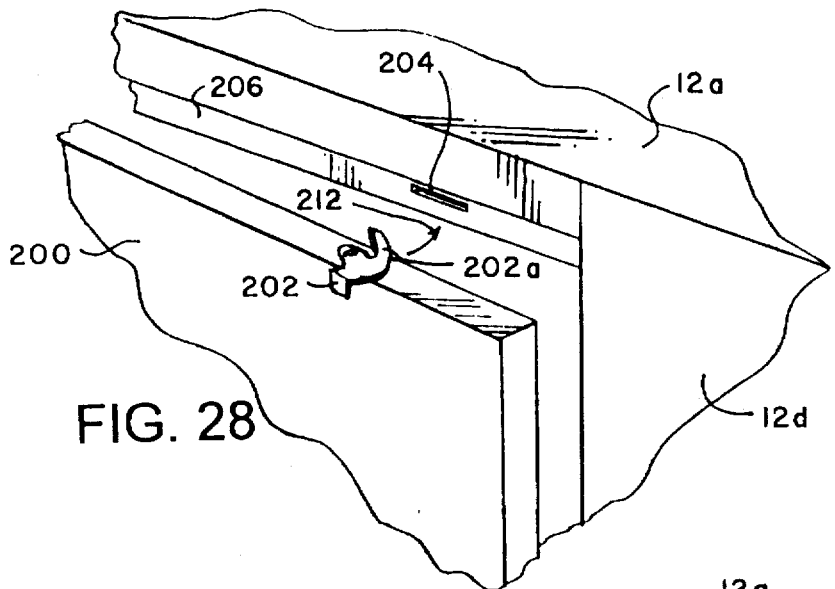
FIG. 28 is a perspective view of a portion of the furnace, illustrating the attachment of a front access panel to the furnace.

Referring now FIGS. 24-26, intake air manifold 38 includes a relatively flat base member 172, a diffuser member 174 and a top member 176 having opposed inlets 40, 42. As can be best seen in FIG. 24, top member 176 has a generally trapezoidal cross-section. Diffuser member 174 has a generally trapezoidal upper section 174a which extends vertically upward from base member 172 and a generally rectangular lower section 174b which extends downwardly through an opening 182 in base member 172.

Diffuser member 174 has a plurality of holes 184. As previously described, intake air manifold 38 is connected to an air intake duct 37 (FIG. 4) through one of the inlets 40, 42. The other inlet 40, 42 is capped. In FIG. 26, combustion air from the air intake duct (not shown in FIG. 26) enters intake air manifold 38 through inlet 42. The opposite inlet 40 is capped, as indicated at 186. Intake air manifold 38 sits on top of burner enclosure 46 and communicates therewith through aligned openings 44 and 182. Opening 44 is shown in FIG. 3. Combustion air entering manifold 38 tends to flow in the direction of arrow 190 (i.e., between inlets 40, 42 and parallel to openings 44 and 182). Upper section 174a functions as a baffle to break up the flow of combustion air between inlets 40, 42, as indicated by arrows 192. Some of the combustion air flows through holes 184 and some of the combustion air is blocked by section 174a and directed downwardly through opening 182. Lower section 174b, which extends into burner enclosure 46, further diffuses the combustion air within burner enclosure 46. A second diffuser member 194 is located in burner enclosure 46. Diffuser member 194 also has plural holes 196 and cooperates with diffuser member 174 to equalize the distribution of combustion air to the plural burners 20. Diffuser member 174 is preferably a relatively flat plastic plate and diffuser member 194 is preferably a relatively flat metal plate.

Figure 29:
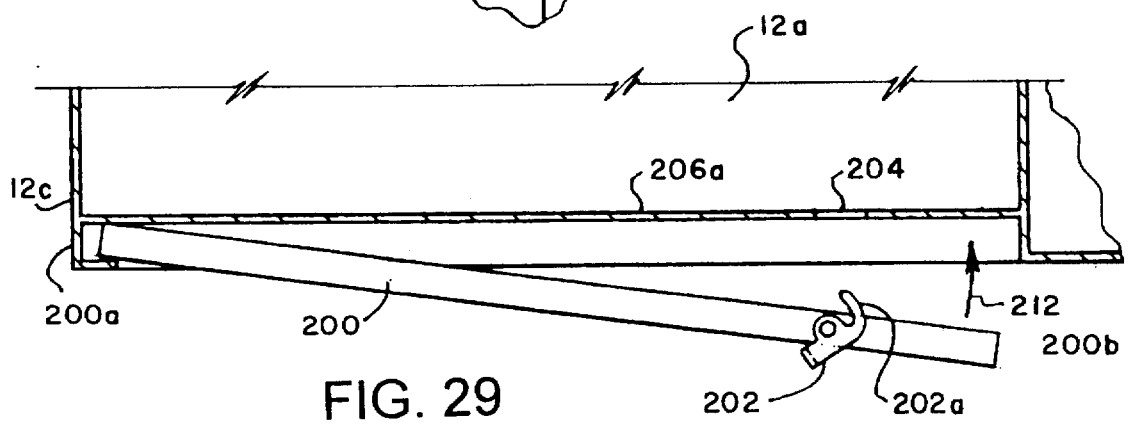
FIG. 29 is a sectional view taken along the line 29—29 of FIG. 27.

Referring now to FIGS. 1-3 and 27-29, furnace 10 is shown in the left horizontal flow position. A front access panel 200 is removably attached to cabinet 12 by means of two latches 202. Access to burners 20, gas valve 22, pressure switch 90, induced draft blower 28 and the other major components of furnace 10 is by removing access panel 200. Each latch 202 has a curved arm member 202a, which engages an elongated slot 204 (FIG. 28) in a corresponding mounting flange 206, 208. Flange 206 depends from wall 12a and flange 208 depends from wall 12b. FIG. 29 depicts the attachment of panel 200. A third mounting flange 210 depends from wall 12c of cabinet 12. One end 200a of panel 200 is inserted behind third mounting flange 210 with panel 200 positioned at an angle with respect to a wall 12d of cabinet 12. After end 200a has been positioned behind flange 210, an opposite end 200b of panel 200 is rotated in the direction of arrow 212 to move latches 202 in the direction of the corresponding slots 204. Each latch 202 is rotated clockwise (as viewed in FIG. 29) so that its corresponding arm 202a extends into the corresponding slot 204. After arm 202a of each latch 202 has been inserted into the corresponding slot 204, each latch 202 is rotated counterclockwise (as viewed in FIG. 29) to move the corresponding arm 202a into engagement with a back surface (e.g., surface 206a in FIG. 29) of the corresponding mounting flange 206, 208, whereby access panel 200 is securely attached to cabinet 12.

The best mode for carrying out the invention has now been described in detail. Since changes in and modifications to the above-described best mode may be made without departing from the nature, spirit or scope of the invention, the invention is not to be limited to said details, but only by the appended claims and their equivalents.

We claim:

1. In a furnace for supplying heated air to an indoor space, said furnace being adapted for at least horizontal flow operation, said furnace having a burner for burning a combustible fuel-air mixture, a heat exchanger having an inlet communicating with said burner for receiving products of combustion therefrom and an outlet, a header communicating with said outlet for receiving products of combustion from said heat exchanger, an inducer communicating with said header for inducing a flow of products of combustion through said heat exchanger and for exhausting products of combustion from said header, and a drain for draining condensation from said header, wherein the improvement comprises:

a manifold located inside said header, said manifold defining first and second chambers within said header, said first chamber being inside said manifold and said second chamber being outside said manifold; and means for sensing differential fluid pressure between said first and second chambers and for disabling said furnace in response to said differential fluid pressure being less than a predetermined magnitude.

2. The furnace of claim 1 wherein said sensing means includes a pressure switch having a first input connector communicating with said first chamber and a second input connector communicating with said second chamber.

3. The furnace of claim 2 wherein said header has first, second, third and fourth connector fittings, said first and second connector fittings being in fluid communication with said first chamber and being adapted to receive said first input connector, said first input connector being connected to a lower one of said first and second connector fittings when said furnace is positioned for horizontal flow operation to effect fluid communication between said pressure switch and said first chamber, an upper one of said first and second connector fittings being capped to inhibit access to said first chamber through said upper one of said first and second connector fittings, said third and fourth connector fittings being in fluid communication with said second chamber and being adapted to receive said second input connector, said second input connector being connected to an upper one of said third and fourth connector fittings when said furnace is positioned for horizontal flow operation to effect fluid communication between said pressure switch and said second chamber, a lower one of said third and fourth connector fittings being capped to inhibit access to said second chamber through said lower one of said third and fourth connector fittings, said furnace being adapted for both left and right horizontal flow operation, said first connector fitting being said lower one of said first and second connector fittings when said furnace is positioned for left horizontal flow operation and said second connector fitting being said lower one of said first and second connector fittings when said furnace is positioned for right horizontal flow operation, said third connector fitting being said upper one of said third and fourth connector fittings when said furnace is positioned for left horizontal flow operation and said fourth connector fitting being said upper one of said third and fourth connector fittings when said furnace is positioned for right horizontal flow operation.

4. The furnace of claim 3 wherein said pressure switch is adapted to disable furnace operation in response to detection of condensation in said first chamber at a level of said lower one of said first and second connector fittings.

5. The furnace of claim 1 wherein said furnace further includes a vestibule panel on which said header is mounted, said header having a mounting surface facing away from said vestibule panel, said inducer being mounted with said mounting surface, said mounting surface being slanted such that a portion of a first plane defined by said mounting surface is not parallel to a portion of a second plane defined by said vestibule panel.

6. In a furnace for supplying heated air to an indoor space, said furnace being adapted for at least horizontal flow operation, said furnace having plural burners for burning a combustible fuel-air mixture and an enclosure in which said burners are housed, an air intake conduit for supplying combustion air to said burners, a heat exchanger having an inlet communicating with said burners for receiving products of combustion therefrom and an outlet, an inducer communicating with said outlet for inducing a flow of products of combustion through said heat exchanger and an exhaust conduit through which said inducer exhausts products of combustion from said furnace, wherein the improvement comprises:

an intake air manifold intermediate said air intake conduit and said burner enclosure, said intake air manifold having an inlet opening and an outlet opening, said inlet opening being adapted to receive said air intake conduit, whereby combustion air is introduced into said intake air manifold through said air intake conduit, said outlet opening communicating with said burner enclosure, whereby combustion air is introduced into said burner enclosure, said intake air manifold further including a diffuser member for interrupting air flow in said intake air manifold and for directing a flow of air through said outlet opening into said burner enclosure.

7. The furnace of claim 6 wherein said furnace is adapted for both left and right horizontal flow operation, said intake air manifold having opposed first and second inlet openings, said diffuser member being intermediate said first and second inlet openings, said air intake conduit being connected to said air intake manifold through said first inlet opening when said furnace is positioned for left horizontal flow operation and through said second inlet opening when said furnace is positioned for right horizontal flow operation.

8. The furnace of claim 7 wherein said diffuser member is a perforated baffle for interrupting air flow between said first and second inlet openings and for directing a flow of air through said outlet opening into said burner enclosure.

9. The furnace of claim 7 wherein said diffuser member is a first diffuser member and said burner enclosure includes a second diffuser member intermediate said outlet opening and said burners for directing air flowing through said outlet opening to each of said burners.

10. The furnace of claim 9 wherein said second diffuser member is also perforated baffle, said second diffuser member being oriented substantially perpendicular with respect to said first diffuser member.

11. The furnace of claim 10 wherein said first diffuser member is a perforated plastic plate and said second diffuser member is a perforated metal plate.

12. In a furnace for supplying heated air to an indoor space, said furnace being adapted for operation in a downflow position and in a horizontal flow position, said furnace having a burner for burning a combustible fuel-air mixture, a heat exchanger having an inlet communicating with said burner for receiving products of combustion therefrom and an outlet, an inducer communicating with said outlet for inducing a flow of products of combustion through said heat exchanger and for exhausting products of combustion from said furnace, and a drain for draining condensation from said furnace, said inducer defining on a suction side thereof a negative gas pressure environment with respect to an external environment and on a discharge side thereof a positive gas pressure environment with respect to the external environment, said drain including a first conduit communicating between the negative gas pressure environment and the external environment for draining condensation from the negative gas pressure environment to the external environment and a second conduit communicating between the positive gas pressure environment and the external environment for draining condensation from the positive gas pressure environment to the external environment, wherein the improvement comprises:

a trap interposed between each of said first and second conduits and the external environment to inhibit non-liquid products of combustion from flowing through said first and second conduits into the external environment, said trap having a housing with first, second and third chambers therein, a first partition separating said first and second chambers and a second partition separating each of said first and second chambers from said third chamber, said trap having first and second inlets communicating with said first and second chambers, respectively, and an outlet communicating with said third chamber, said first conduit communicating with said first chamber through said first inlet and said second conduit communicating with said second chamber through said second inlet wherein condensation from the negative gas pressure environment enters said trap through said first conduit and said first chamber and condensation from the positive gas pressure environment enters said trap through said second conduit and said second chamber, said first and second chambers communicating with said third chamber beyond a distal end of said second partition, said first chamber communicating directly with said second chamber beyond a distal end of said first partition;

said first and second chambers each having a major dimension and a minor dimension, the major dimensions of said first and second chambers being oriented horizontally when said furnace is positioned for downflow operation, wherein condensation accumulates in said first and second conduits at respective first and second levels to define first and second liquid seals, respectively, between the negative gas pressure environment and the external environment and between the positive gas pressure environment and the external environment and condensation accumulates in said third chamber at an equilibrium level between said first and second levels;

the respective major dimensions of said first and second chambers being oriented in a vertical direction when said furnace is positioned for horizontal flow operation wherein condensation accumulates in said first and second chambers at respective third and fourth levels to provide third and fourth liquid seals, respectively, between the negative gas pressure environment and the external environment and between the positive gas pressure environment and the external environment and condensation accumulates in said third chamber at an equilibrium level between said third and fourth levels.

13. The furnace of claim 12 wherein said trap has first and second outlets on respective opposed walls of said housing.

14. The furnace of claim 12 wherein said housing is defined by six generally rectangular walls, said outlet being proximate to a corner of one of said walls such that said outlet is in an upper portion of said trap when said furnace is positioned for downflow operation and when said furnace is positioned for horizontal flow operation.

15. The furnace of claim 12 wherein said first partition extends from one wall of said housing toward an opposite wall thereof and terminates short of said opposite wall to define the distal end of said first partition, said second partition extending from said one wall toward said opposite wall and terminating short of said opposite wall to define the distal end of said second partition, said second partition extending closer to said opposite wall than said first partition such that said second partition extends beyond said first partition in the direction of said opposite wall, whereby said first chamber communicates with said second chamber before either said first chamber or said second chamber communicates with said third chamber.

16. The furnace of claim 15 wherein said first partition defines a portion of a first plane which is perpendicular to a portion of a second plane defined by said second partition.

17. The furnace of claim 12 further including a collar coupled between said first and second conduits and said trap, said collar having a base member, first and second sockets projecting from said base member and first and second nipples projecting from said first and second sockets, respectively, said first and second nipples defining first and second intake passageways, respectively, and being coupled to said first and second conduits, respectively, said first and second intake passageways communicating with said first and second sockets, respectively, said trap having first and second male fittings projecting from said housing, said first male fitting having an internal passageway defining said first inlet and said second male fitting having an internal passageway defining said second inlet, said first and second male fittings being in mating engagement with said first and second sockets, respectively, whereby said trap is attached to said collar, said first chamber communicating with said first conduit through said first male fitting, said first socket and said first nipple, said second chamber communicating with said second conduit through said second male fitting, said second socket and said second nipple.

18. The furnace of claim 17 wherein said base member has at least one mounting hole, whereby said collar is mounted in a fixed position with said furnace.

* * * * *